US006223393B1

(12) United States Patent
Knopf

(10) Patent No.: US 6,223,393 B1
(45) Date of Patent: May 1, 2001

(54) REDUNDANT HINGE ELEMENT FOR A NOTEBOOK COMPUTER

(75) Inventor: Eric Andrew Knopf, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/349,164

(22) Filed: Jul. 9, 1999

(51) Int. Cl.$^7$ ................................ E05D 3/06; E05D 15/12
(52) U.S. Cl. ................................ 16/366; 16/368; 16/386; 16/387
(58) Field of Search .............................. 16/366, 368, 369, 16/224, 226, 227, 254, 260, 262, 266, 267, 386, 387, 356; 361/681, 682, 683; 160/235, 229.1; 403/54; 59/85, 89; 446/125, 120

(56) References Cited

U.S. PATENT DOCUMENTS

| 422,707 | * | 3/1890 | Bockel et al. ........................ 160/235 |
| 2,642,018 | * | 6/1953 | Weeber ............................... 160/235 |
| 2,805,084 | * | 9/1957 | Hall ....................................... 59/85 |
| 3,680,927 | * | 8/1972 | Neureuther ............................. 16/366 |
| 4,665,585 | * | 5/1987 | Westin .................................. 16/302 |
| 4,968,171 | * | 11/1990 | shell ..................................... 16/366 |
| 5,268,816 |   | 12/1993 | Abell, Jr. et al. . |
| 5,276,589 |   | 1/1994 | Bartlett et al. . |
| 5,335,142 |   | 8/1994 | Anderson . |
| 5,390,075 |   | 2/1995 | English et al. . |
| 5,494,447 |   | 2/1996 | Zaidan . |
| 5,503,497 | * | 4/1996 | Dudley et al. ........................ 403/103 |
| 5,548,478 |   | 8/1996 | Kumar et al. . |
| 5,566,048 |   | 10/1996 | Esterberg et al. . |
| 5,581,440 | * | 12/1996 | Toedter ............................... 361/683 |
| 5,668,570 |   | 9/1997 | Ditzik . |
| 5,708,561 |   | 1/1998 | Huilgol et al. . |
| 5,781,407 |   | 7/1998 | Brauel . |
| 5,796,576 |   | 8/1998 | Kim . |
| 5,805,415 |   | 9/1998 | Tran et al. . |
| 5,832,566 |   | 11/1998 | Quek et al. . |
| 5,835,342 |   | 11/1998 | Hunte . |
| 5,845,366 |   | 12/1998 | Kuroda . |

OTHER PUBLICATIONS

Patent Abstracts of Japan, "Swivel Unit for Display Device", Publication No. 10177354, Jun. 30, 1998 [Appln. No. 08353185 filed Dec. 16, 1996, Applicant: Kokusai Electric Co. Ltd.] Abstract 1–page.

* cited by examiner

Primary Examiner—Chuck Y. Mah
(74) Attorney, Agent, or Firm—Gates & Cooper

(57) ABSTRACT

A redundant hinge element and a hinge assembly made from the redundant hinge element that are adapted to provide pivotal connection between casings of a notebook computer, laptop computer, handheld computer, palmtop computer, or other appliance.

21 Claims, 6 Drawing Sheets

REDUNDANT HINGE ELEMENT FOR A NOTEBOOK COMPUTER

BACKGROUND OF THE INVENTION

1. Field of the Invention

The present invention generally relates to hinges that are adapted to provide pivotal connection between casings of a notebook computer.

2. Description of Related Art

Hinge devices are used for providing pivotal connection between different parts of casings of an apparatus. In certain applications, these pivoting parts must also have the capability of being held fast intermittently with respect to one another in varying orientations. As an example, in a laptop computer having a tiltable lid, the lid is capable of being tilted through a range of angles, but is able to remain fixed in a particular inclination that an operator selects to provide optimum visibility of the computer screen.

However, most hinges for notebook computer suffer from a number of deficiencies. For example, most hinges do not allow for more than 180 degrees of rotation between the base and lid (e.g., screen and keyboard). Moreover, even if the screen and keyboard are open to 180 degrees, the device is not truly flat due to the "stepped" area underneath the screen where it attaches to the keyboard. Further, the geometry and mechanical requirements of the standard pivot hinge contribute to the overall thickness of the notebook computer. Thus, there is a need in the art for an improved hinge that eliminates these deficiencies.

SUMMARY OF THE INVENTION

To overcome the limitations in the prior art described above, and to overcome other imitations that will become apparent upon reading and understanding the present specification, the present invention discloses a redundant hinge element and a hinge assembly made from the redundant hinge element that are adapted to provide pivotal connection between casings of a notebook computer, laptop computer, handheld computer, palmtop computer, or other appliance.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

DESCRIPTION OF THE NOTEBOOK HINGE

Figure 1:
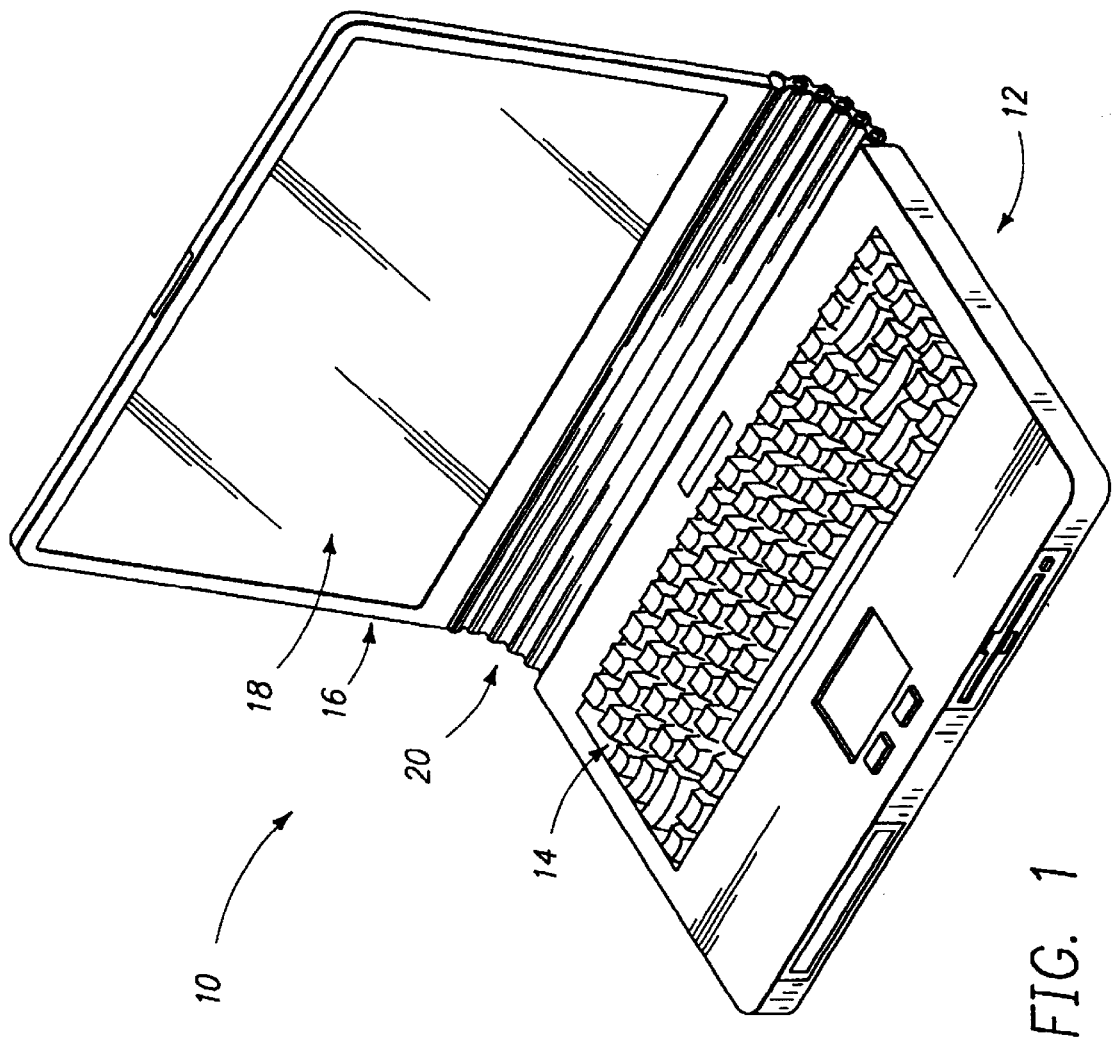
FIG. 1 illustrates a notebook computer constructed in accordance with an embodiment of the invention.

FIG. 1 illustrates a notebook computer 10 constructed in accordance with an embodiment of the invention, wherein the notebook computer 10 includes a base 12 that incorporates a keyboard 14 and a lid 16 that incorporates a screen 18, wherein the base 12 and lid 14 are coupled together with a hinge assembly 20. The hinge assembly 20 allows the lid 16 to be tilted and positioned with respect to the base 12 in an almost unlimited range of inclinations between a closed position and a maximum open position. When closed, the lid 16 forms a protective enclosure for the keyboard 14 and screen 18, as well as a protective cover for the other components inside the base 12. When opened, the lid 16 may be tilted at a range of angles relative to the base 12, so that the screen 18 is viewable to an operator. Generally, the operator will tilt the lid 16 to an inclination that provides optimum visibility of the screen 18.

It is understood that the invention may be incorporated into many types of apparatus, so long as they utilize similar bases 12 and tiltable lids 16 or other components. For example, the base 12 may incorporate a digitizing pad rather than the keyboard 14; the base 12 may incorporate the screen 18 rather than the keyboard 14; the screen 18 itself may comprise a touch screen or digitizing pad, etc. Thus, the present invention could be used with laptop computers, handheld computers, palmtop computers, etc., as well as any number of other electronic devices. The present invention is particularly relevant to appliances or apparatus which incorporate a component that is able to be tilted and positioned in a range of orientations to suit the preference of a user. However, for convenience, the concepts of the present invention are illustrated, by way of example only, in a hinge assembly 20 that is incorporated in the casing of a notebook computer 10.

Figure 2:
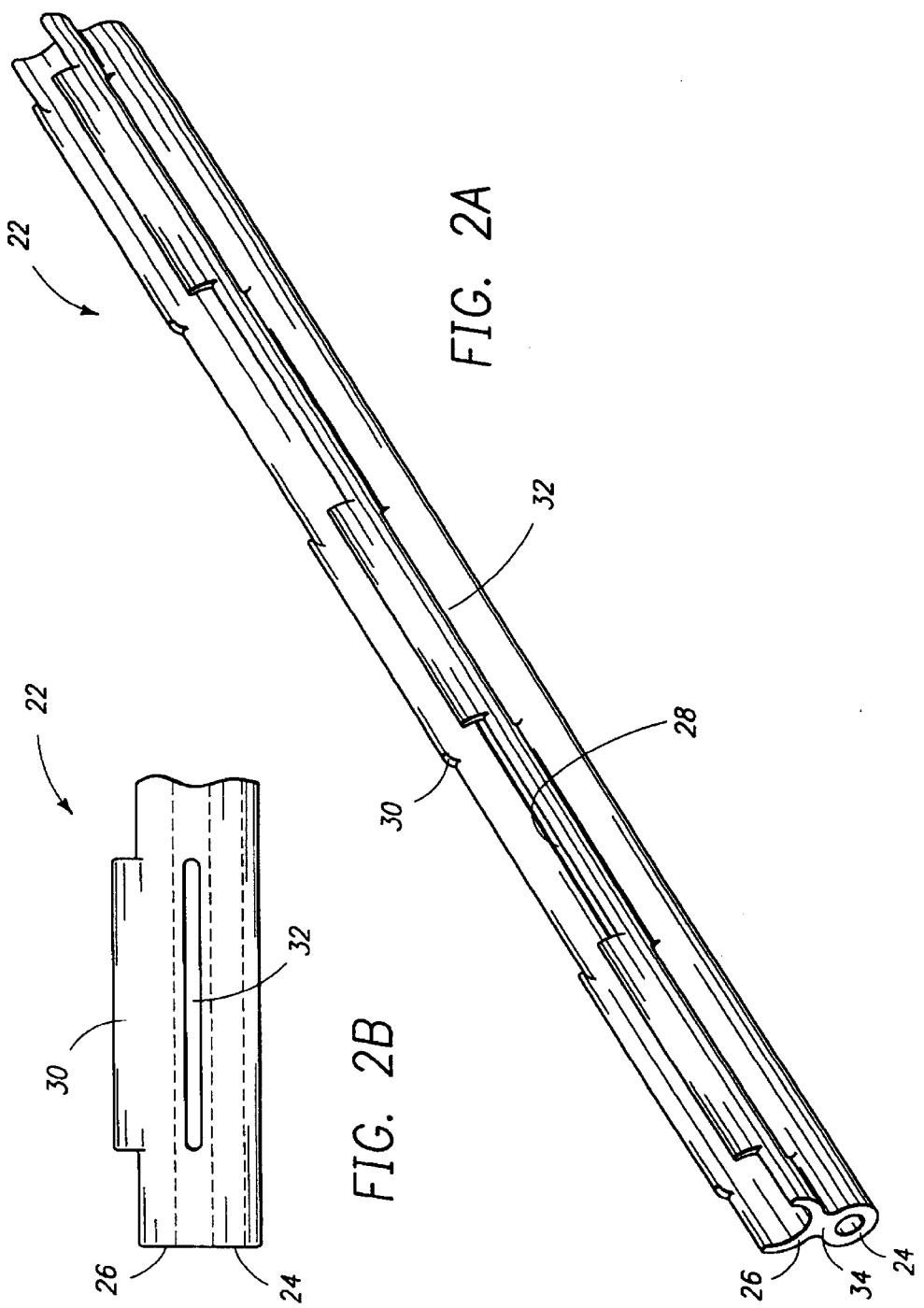
FIG. 2A shows a first perspective view of a redundant hinge element and FIG. 2B shows an orthogonal (front) view of part of the redundant hinge element.

FIG. 2A shows a perspective view of a redundant hinge element 22, a plurality of which are assembled together in an array to create the hinge assembly 20 (as described in more detail below), and FIG. 2B shows an orthogonal (front) view of part of the hinge element 22. Each redundant hinge element 22 is comprised of a cylindrical portion 24 that may have a hollow or solid cross-section, and a cylindrical slot portion 26 that is partially open to accept the cylindrical portion 24 of an adjacent, interlocking, redundant hinge element 22. The cylindrical portion 24 may include one or more cable raceways 28 and the cylindrical slot portion 26 may include multiple retention wings 30. One or more pass-thru slots 32 may be present in a connecting portion 34 between the cylindrical portion 24 and the cylindrical slot portion 26.

Figure 3:
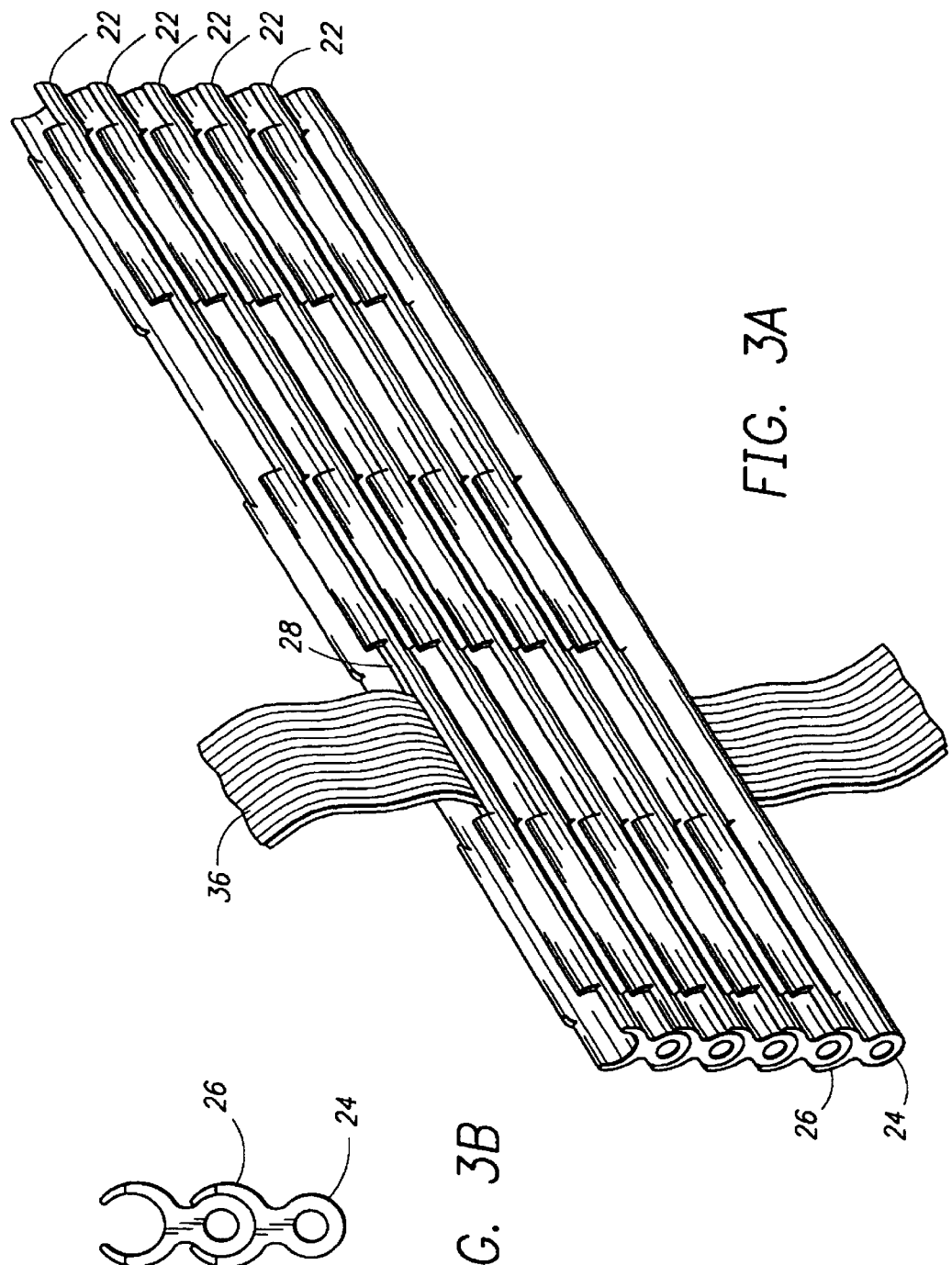
FIG. 3A shows a first perspective view of the hinge array comprised of a plurality of interlocking redundant hinge elements and FIG. 3B shows a first axial cross-sectional view of the hinge array of interlocking redundant hinge elements.

FIG. 3A shows a first perspective view of the hinge assembly 20 comprised of a plurality of interlocking redundant hinge elements 22 and FIG. 3B shows a first axial cross-sectional view of the hinge assembly 20 of interlocking redundant hinge elements 22. These views illustrate the engagement of the cylindrical portion 24 of a second redundant hinge element 22 with the cylindrical slot portion 26 of a first redundant hinge element 22.

When seated in the cylindrical slot portion 26 of a first redundant hinge element 22, the cylindrical portion 24 of a second redundant hinge element 22 is substantially in co-axial alignment with the cylindrical slot portion 26 of the first redundant hinge element 22. Moreover, the cylindrical portion 24 of the second redundant hinge element 22 has an axis of rotation of approximately 120 degrees when seated in the cylindrical slot portion 26 of the first redundant hinge element 22.

This hinge assembly 20 takes the place of the single pivot hinge normally used in notebook computers 10. Moreover, the hinge assembly 20 is assembled with a geometric interference fit that allows rotation of the individual interlocking hinge elements 22, but also retains enough friction to allow static positioning of the lid 16 and screen 18. Instead of the entire cylindrical portion 24 frictioning against the cylindrical slot portion 26, alternative embodiments may use short sections or "plugs" of high friction material (e.g., rubber) to replace the homogenous material in portion 24, so that only these sections of the cylindrical portion 24 friction against the cylindrical slot portion 26.

FIG. 3A also illustrates how a ribbon cable 36 may be threaded through the cable raceways 28.

Figure 4:
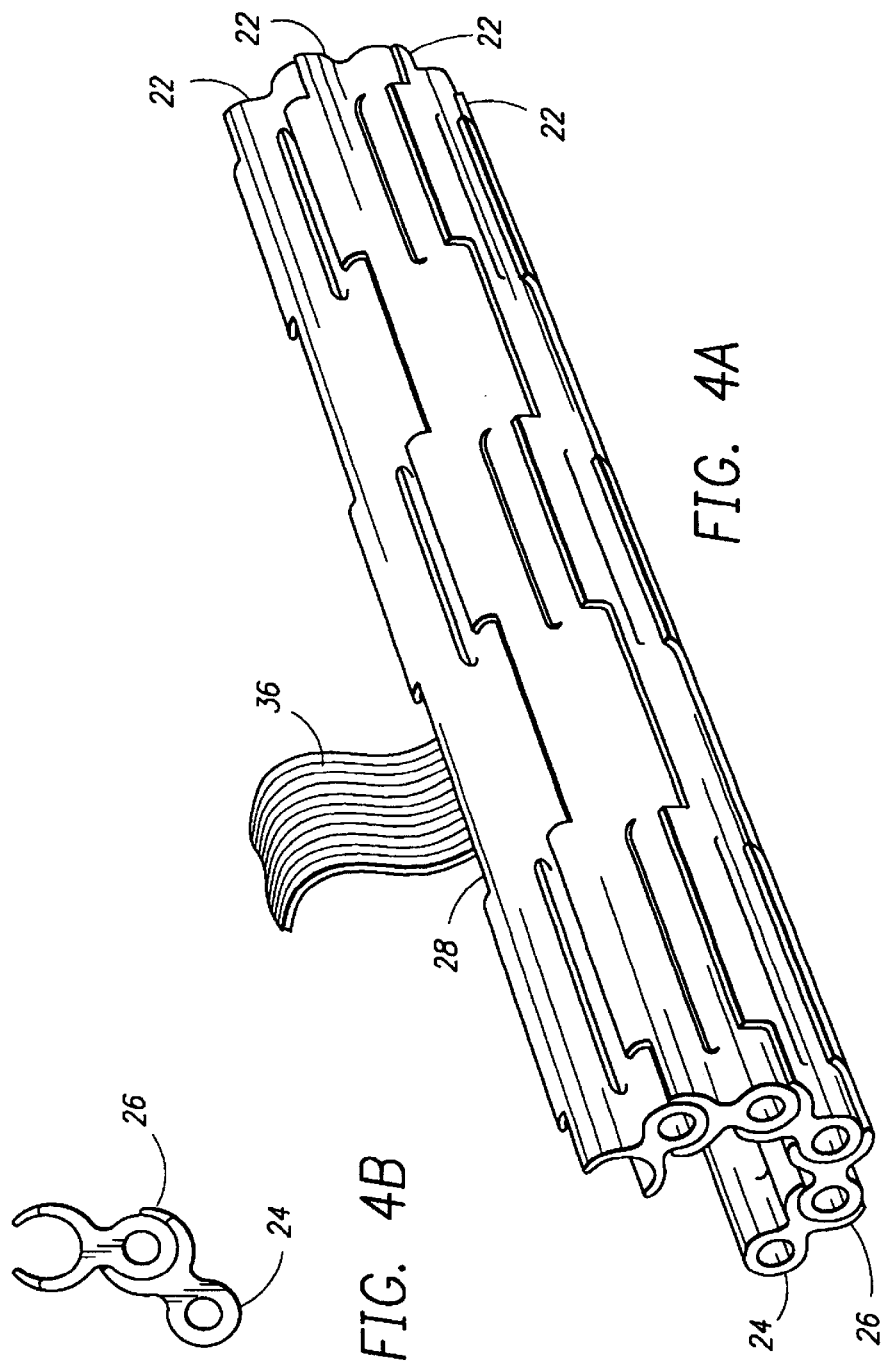
FIG. 4A shows a second perspective view of the hinge array and FIG. 4B shows a second axial cross-sectional view of the hinge array.

FIG. 4A shows a second perspective view of the hinge assembly 20 and FIG. 4B shows a second axial cross-sectional view of the hinge assembly 20. These views illustrate the shape of the hinge assembly 20 when the lid 16 is closed and covers the base 12. FIG. 4A also illustrates a ribbon cable 36 that is threaded through the cable raceways 28.

In the preferred embodiment, the interlocking redundant hinge elements 22 of the hinge assembly 20 are comprised of a non-metalic frictional material, although other suitable materials may be selected as well. It is preferred that the material have a degree of resilience that allows the frictional material of the inner surface of the cylindrical slot portion 26 to grip the outer surface of the cylindrical portion 24.

Figure 5:
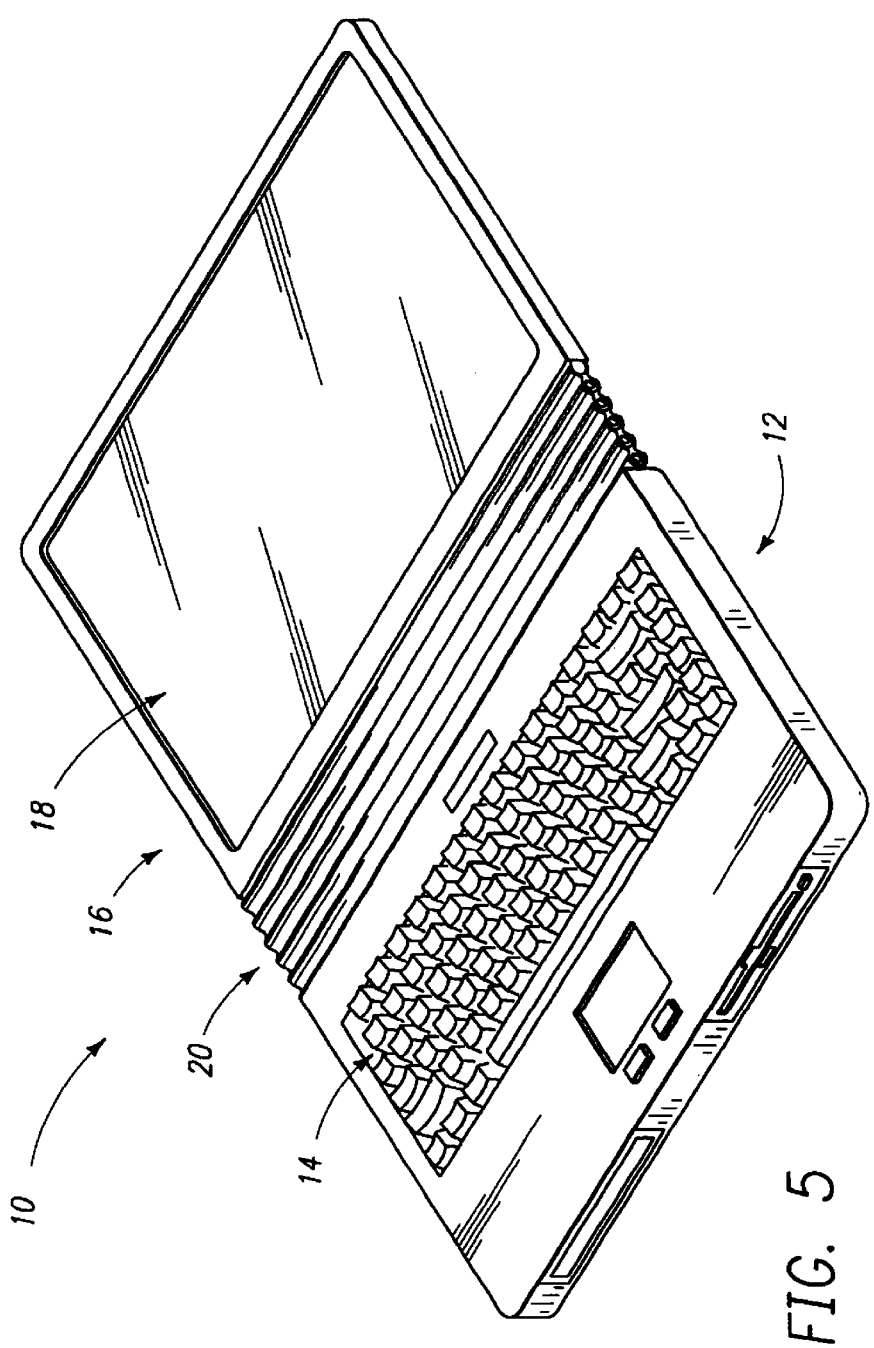
FIG. 5 illustrates a notebook computer constructed in accordance with an embodiment of the invention wherein the notebook computer is opened to 180 degrees of rotation between the base and lid.
Figure 6:
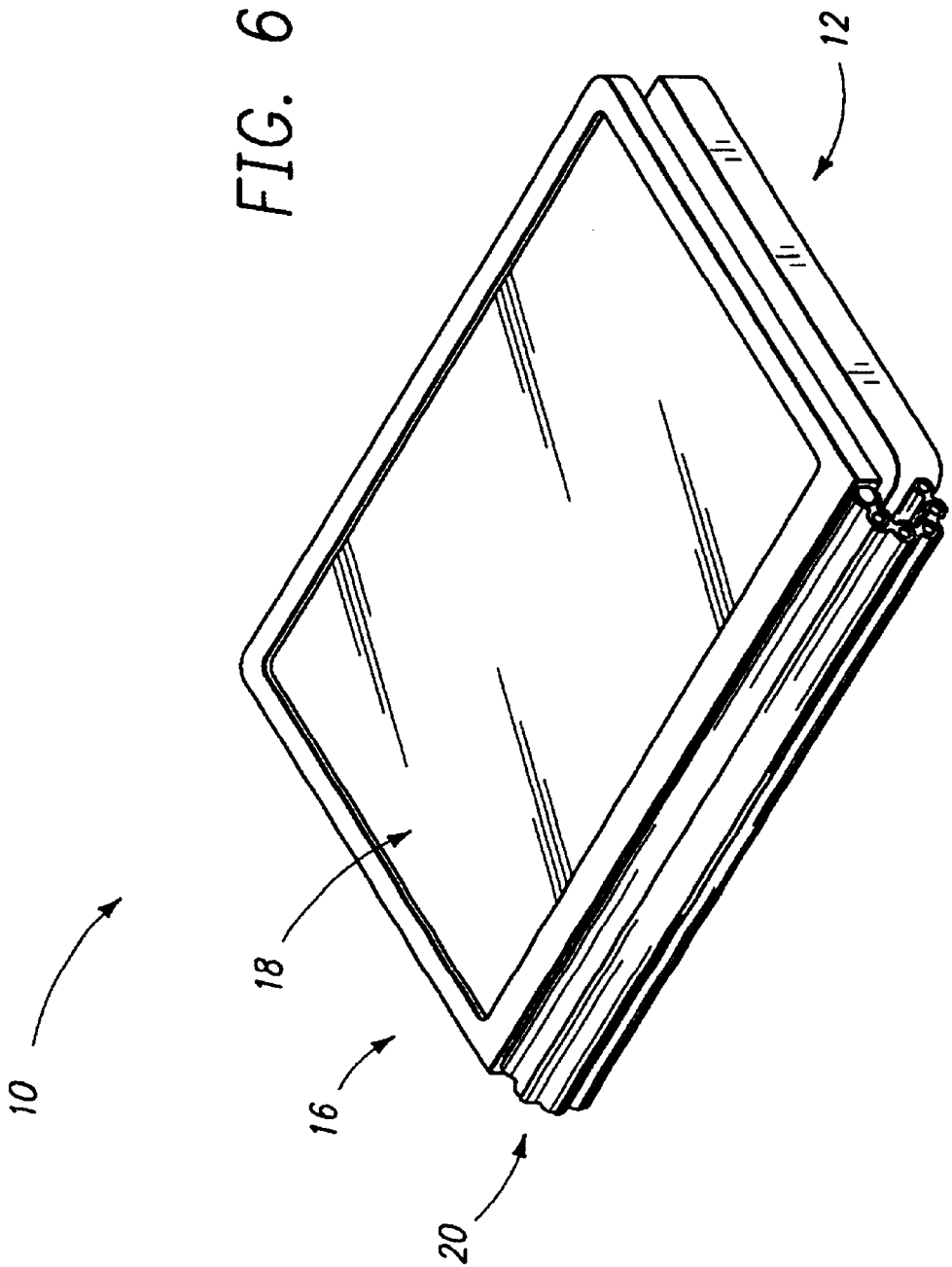
FIG. 6 illustrates a notebook computer constructed in accordance with an embodiment of the invention wherein the notebook computer is fully opened to 360 degrees of rotation between the base and lid.

Referring again to FIG. 1, as well as FIGS. 5 and 6, the cylindrical portion 24 and the cylindrical slot portion 26 are adapted to connect the hinge assembly 20 to connect to both the base 12 and lid 16 in a manner that provides pivotal connection between these parts. In a preferred embodiment, the base 12 is provided with a connector mechanism for the hinge assembly 20 in the form of a cylindrical slot portion 26 protruding from one end of the base 12 for engagement with the bottom-most cylindrical portion 24 of the hinge assembly 20. Similarly, the lid 16 is provided with a connector mechanism for the hinge assembly 20 in the form of a cylindrical portion 24 protruding from one end of the lid 16 for engagement with the top-most cylindrical slot portion 26 of the hinge assembly 20.

Note, however, that the invention in its broadest aspect is not limited to particular forms of connector mechanisms. A variety of designs of connector mechanisms may be contemplated which are able to provide connection of the hinge assembly 20 to different parts of the base 12 and lid 16.

The hinge assembly 20 thus constituted allows for more than 180 degrees of rotation between the base 12 and lid 16. Moreover, when the base 12 and lid 16 are open to a 180 degree inclination, the notebook computer 10 is flat, because there is no "stepped" area underneath the lid 16 where it attaches to the base 12. This position is shown in FIG. 5. Further, the geometry and mechanical requirements of the hinge assembly 20 reduce the overall thickness of the notebook computer.

Indeed, the hinge assembly 20 allows a full 360 degree pivoting between the lid 16 and base 12, where they can touch front to front (fully closed position) or be fully folded back on each other to touch back to back (fully open position). This fully open position is shown in FIG. 6.

CONCLUSION

This concludes the description of the preferred embodiment of the invention. The following describes some alternative embodiments for accomplishing the present invention.

For example, any apparatus or appliance that requires a hinge so that its components can be tilted and positioned in a range of orientations could benefit from the present invention. Specifically, as noted above, the present invention could also be used with notebook computers, laptop computers, handheld computers, palmtop computers, etc., as well as other electronic devices.

In summary, the present invention discloses a redundant hinge element and hinge assembly made therefrom that are adapted to provide pivotal connection between casings of a notebook computer.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A hinge device for pivotally connecting first and second parts of a casing, comprising:
   (a) a plurality of interlocking, redundant hinge elements that are assembled together to create a hinge assembly; and
   (b) each of the redundant hinge elements comprised of a cylindrical portion and a cylindrical slot portion that is partially open to accept the cylindrical portion of an adjacent, interlocking, redundant hinge element, wherein the cylindrical slot portion includes one or mote retention wings;
   (c) wherein each end of the hinge assembly is adapted for connection to one of the first and second parts of the casing such that rotation of the hinge assembly causes pivotal motion between the first and second parts of the casing.

2. The hinge device of claim 1, wherein the cylindrical portion includes one or more cable raceways.

3. The hinge device of claim 1, wherein a connecting portion between the cylindrical portion and the cylindrical slot portion includes one or more pass-thru slots.

4. The hinge device of claim 1, wherein the hinge assembly pivotally the connects first and second parts of the casing.

5. The hinge device of claim 4, wherein the casing comprises a casing selected from a group comprising a notebook computer casing, a laptop computer casing, a handheld computer casing, and a palmtop computer casing.

6. The hinge device of claim 4, wherein the first part comprises a base of the casing and the second part comprises a lid of the casing.

7. The hinge device of claim 6, wherein the hinge assembly allows the lid to be tilted and positioned with respect to the base in a range of inclinations between a closed position and a maximum tilt position.

8. The hinge device of claim 1, wherein the cylindrical portion of a first redundant hinge element is substantially in co-axial alignment with the cylindrical slot portion of a second redundant hinge element when seated in the cylindrical slot portion of the second redundant hinge element.

9. The hinge device of claim 8, wherein the cylindrical portion of the first redundant hinge element has an axis of rotation of approximately 120 degrees when seated in the cylindrical slot portion of the second redundant hinge element.

10. The hinge device of claim 1, wherein the hinge assembly allows for more than 180 degrees of rotation between the first and second parts.

11. The hinge device of claim 10, wherein the hinge assembly allows for 360 degrees of rotation between the first and second parts.

12. A hinge assembly for pivotally connecting a base and lid of a casing, wherein the hinge assembly is comprised of interlocking hinge elements, each of the hinge elements comprising of a cylindrical portion and a cylindrical slot portion that is partially open to accept the cylindrical portion of another hinge element, wherein the cylindrical slot portion of each of the interlocking hinge elements includes means for retaining the cylindrical portion of another hinge element, and the hinge assembly connects the base to the lid in a manner that permits pivotal rotation of the base and lid relative to each other.

13. The hinge assembly of claim 12, wherein the cylindrical portion of a first hinge element is substantially in co-axial alignment with the cylindrical slot portion of a second redundant hinge element when seated in the cylindrical slot portion of the second hinge element.

14. The hinge assembly of claim 13, wherein the cylindrical portion of the first hinge element has an axis of rotation of approximately 120 degrees when seated in the cylindrical slot portion of the second redundant hinge element.

15. The hinge assembly of claim 12, wherein the hinge assembly allows for more than 180 degrees of rotation between the base and lid.

16. The hinge assembly of claim 15, wherein the hinge assembly allows for 360 degrees of rotation between the base and lid.

17. A hinge element for a hinge assembly comprising a cylindrical portion and a cylindrical slot portion that is partially open to accept the cylindrical portion of another hinge element, wherein the cylindrical slot portion includes one or more retention wings for retaining the accepted cylindrical portion of another hinge element within the cylindrical slot portion.

18. The hinge element of claim 17, wherein a plurality of interlocking hinge elements are assembled together to create the hinge assembly.

19. The hinge element of claim 17, wherein the cylindrical portion includes one or more cable raceways.

20. The hinge element of claim 19, wherein a connecting portion between the cylindrical portion and the cylindrical slot portion includes one or more pass-thru slots.

21. The hinge element of claim 17, wherein the cylindrical portion of the other hinge element is substantially in co-axial alignment with the cylindrical slot portion of the hinge element when seated in the cylindrical slot portion of the hinge element.

\* \* \* \* \*